(12) United States Patent
Criel et al.

(10) Patent No.: US 12,104,748 B2
(45) Date of Patent: Oct. 1, 2024

(54) PRESSURE VESSEL WITH OPTIMIZED OUTER COMPOSITE STRUCTURE

(71) Applicant: Plastic Omnium New Energies France, Lyons (FR)

(72) Inventors: Bjorn Criel, Brussels (BE);
Khanh-Hung Nguyen, Brussels (BE);
Geert Nouwen, Brussels (BE); Dries Devisscher, Brussels (BE)

(73) Assignee: Plastic Omnium New Energies France, Lyons (FR)

( * ) Notice: Subject to any disclaimer, the term of this patent is extended or adjusted under 35 U.S.C. 154(b) by 0 days.

(21) Appl. No.: 18/688,523

(22) PCT Filed: Sep. 7, 2022

(86) PCT No.: PCT/EP2022/074886
§ 371 (c)(1),
(2) Date: Mar. 1, 2024

(87) PCT Pub. No.: WO2023/036833
PCT Pub. Date: Mar. 16, 2023

(65) Prior Publication Data
US 2024/0263738 A1 Aug. 8, 2024

(30) Foreign Application Priority Data
Sep. 8, 2021 (LU) ........................................ 500634

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01);
(Continued)

(58) Field of Classification Search
CPC ...... F17C 2201/0109; F17C 2203/0604; F17C 2203/067; F17C 2203/0621
See application file for complete search history.

(56) References Cited

U.S. PATENT DOCUMENTS

| | | |
|---|---|---|
| 2007/0205201 A1 | 9/2007 | Cundiff et al. |
| 2012/0048862 A1 | 3/2012 | Otsuka et al. |

(Continued)

FOREIGN PATENT DOCUMENTS

| | | |
|---|---|---|
| JP | 2018-25287 | 2/2018 |
| JP | 2020-70907 | 5/2020 |

(Continued)

OTHER PUBLICATIONS

International Search Report Issued Dec. 7, 2022, in PCT/EP2022/074886, filed on Sep. 7, 2022, 4 pages.
(Continued)

*Primary Examiner* — Don M Anderson
(74) *Attorney, Agent, or Firm* — Oblon, McClelland, Maier & Neustadt, L.L.P.

(57) ABSTRACT

A pressure vessel including an internal fluid storage chamber, and an outer composite structure enclosing or encasing the internal fluid storage chamber. The outer composite structure has a thickness containing both helical layers and hoop layers of reinforcing fibers, wherein at least 20% of a combined thickness of all of the helical layers are located within a 25% innermost thickness of the outer composite structure. The internal fluid storage chamber is defined by a liner including a generally cylindrical central portion having a first outer diameter at a first longitudinal end, and a first dome-shaped longitudinal end portion having a base portion and a first intermediate portion located between the generally cylindrical central portion and the base portion for connecting the first longitudinal end of the generally cylindrical central portion to the base portion of the first dome-shaped longitudinal end portion.

12 Claims, 3 Drawing Sheets

(52) U.S. Cl.
CPC .......... *F17C 2203/0604* (2013.01); *F17C 2203/067* (2013.01); *F17C 2205/0305* (2013.01); *F17C 2270/0168* (2013.01)

(56) References Cited

U.S. PATENT DOCUMENTS

| | | |
|---|---|---|
| 2013/0299505 A1 | 11/2013 | Otsubo et al. |
| 2015/0034233 A1 | 2/2015 | Hatta et al. |
| 2017/0241591 A1 | 8/2017 | Nishibu et al. |
| 2018/0045371 A1 | 2/2018 | Lee |
| 2018/0340655 A1 | 11/2018 | Lee |
| 2019/0390821 A1 | 12/2019 | Katano et al. |
| 2020/0116304 A1 | 4/2020 | Lee |
| 2020/0247070 A1 | 8/2020 | Katano |

FOREIGN PATENT DOCUMENTS

| | | |
|---|---|---|
| JP | 2020-139581 | 9/2020 |
| JP | 2021-14856 | 2/2021 |

OTHER PUBLICATIONS

Office Action issued Jul. 29, 2024, in Application No. 2024-515475 with English Translation.

PRESSURE VESSEL WITH OPTIMIZED OUTER COMPOSITE STRUCTURE

CROSS REFERENCE TO RELATED APPLICATIONS

This application is a National Stage entry under 35 U.S.C. § 371 of PCT/EP2022/074886, filed on Sep. 7, 2022, and claims priority to Luxembourg Patent Application No. LU500634, filed on Sep. 8, 2021. The entire contents of both are incorporated herein by reference.

TECHNICAL FIELD OF THE INVENTION

The present invention relates to pressure vessels for vehicles. More precisely, the invention relates to a pressure vessel and a vehicle comprising such a pressure vessel.

BACKGROUND OF THE INVENTION

High pressure vessels for vehicles generally comprise a hollow container, also called a liner, having a general cylindrical shape with two dome-shaped longitudinal ends and made of plastic material, such material being chosen for being lightweight and cheap to produce, or other material such as metal (e.g. aluminum). This container is intended for storing gas under pressure, for example dihydrogen, to be used by the vehicle equipped with the pressure vessel for diverse functions, such as source of power. The gas under pressure exerts strong constraints on the inner surface of the container which may damage the integrity of the container and cause hazardous leakage, especially with combustible gas like dihydrogen.

To improve the mechanical properties of the container, it is known to wind a filament made of a reinforcing fiber, for example carbon fiber, all around the outer surface of the container. The filament is embedded in a resin to facilitate the winding and to make sure that each piece of the outer surface of the container is covered.

It is known, for example as disclosed in the published patent documents US 2020/116304 A1, US 2012/048862 A1 and US 2017/241591 A1, to wind the outer surface of the container with both helical layers and hoop layers of reinforcing fibers to form an outer composite structure. In order to avoid excessive mechanical stress in the innermost layers of the outer composite structure at the boundary between the general cylindrical shape and the dome-shaped longitudinal ends of the container when the pressure vessel contains a gas under high pressure, it is known to increase the thickness of the helical layers. This solution is not satisfactory because it increases the weight of the pressure vessel.

For the dome-shaped longitudinal ends of the container, it is known to manufacture a dome reinforcement part or dome reinforcement shell, comprising a winding of filament, independently of the container and then, in a subsequent step, fitting the dome reinforcement shell on the container. The document DE 10 2017 208 492 A1 provides an example of such a dome reinforcement shell. When such a dome reinforcement shell is used, the innermost layers of the outer composite structure at the boundary between the general cylindrical shape and the dome-shaped longitudinal ends of the container is also subjected to an excessive mechanical stress when the pressure vessel contains a gas under high pressure.

In view of the above, there exists a need for optimizing the pressure vessel by maintaining good mechanical properties while reducing the quantity of reinforcing fiber used.

SUMMARY OF THE INVENTION

The present invention provides a pressure vessel comprising an internal fluid storage chamber and an outer composite structure enclosing or encasing the internal fluid storage chamber, the outer composite structure has a thickness comprising both helical layers and hoop layers of reinforcing fibers, wherein at least 20% of the combined thickness of all helical layers are located within the 25% innermost thickness of the outer composite structure, preferably, at least 30% of the combined thickness of all helical layers are located within the 20% innermost thickness of the outer composite structure.

Thanks to the invention, the distribution of the helical layers in the outer composite structure thickness is optimized. Indeed, compared with prior art, by arranging at least 20% of the combined thickness of all helical layers within the 25% innermost thickness of the outer composite structure, it is no longer necessary to increase the thickness of the outer composite structure, in particular the combined thickness of all helical layers, to lower the mechanical stress in the innermost layers of the outer composite structure when the pressure vessel contains a gas under high pressure. The benefits of the invention are even more evident when at least 30% of the combined thickness of all helical layers are arranged within the 20% innermost thickness of the outer composite structure. This makes it possible to use less of fiber for the manufacture of the outer composite structure while maintaining good mechanical properties. This allows a weight reduction of the resulting pressure vessel. Further, this allows a reduction of manufacturing time as the time of winding the outer composite structure over the liner is reduced.

By the expression "helical layers of reinforcing fibers", it is meant continuous filaments of fibers arranged in a helical direction as reinforcement, i.e. arranged with an angle comprised between 5° and 85° with respect to the longitudinal axis of the pressure vessel.

By the expression "hoop layers of reinforcing fibers", it is meant continuous filaments of fibers arranged in a hoop direction as reinforcement, i.e. arranged with an angle comprised between 85° and 90° with respect to the longitudinal axis of the pressure vessel.

By the expression "the combined thickness of all helical layers", it is meant the thickness of a stack of layers formed by stacking all the helical layers of the outer composite structure.

By the expression "innermost thickness of the outer composite structure", it is meant the thickness of the outer composite structure closest to the internal fluid storage chamber.

According to the present invention, the internal fluid storage chamber is defined by a liner comprising:
  a generally cylindrical central portion having a first outer diameter D1 at a first longitudinal end,
  a first dome-shaped longitudinal end portion having a base portion and a first intermediate portion located between the generally cylindrical central portion and the first dome-shaped longitudinal end portion for connecting the first longitudinal end of the generally cylindrical central portion to the base portion of the first dome-shaped longitudinal end portion,
and the pressure vessel further comprises a first dome reinforcement shell having a shape complementary to the shape of the first dome-shaped longitudinal end portion and its first intermediate portion, said first dome reinforcement shell being fitted on the liner only on the first dome-shaped longitudinal end portion and its first intermediate portion.

By the expression "a generally cylindrical central portion", it is meant that the central portion appears to be cylindrical as viewed from its outer surface and generally sweep out a cylindrical shape in space.

Thanks to the complementary shape of the first dome reinforcement shell, the mechanical properties of the pressure vessel are improved by reinforcing the first dome-shaped longitudinal end portion and its first intermediate portion. In particular, the mechanical stress is reduced inside the outer composite structure, especially inside the innermost thickness of the outer composite structure. This makes it possible to use less of fiber for the manufacture of the outer composite structure while maintaining good mechanical properties. This allows a weight reduction of the resulting pressure vessel. Further, this allows a reduction of manufacturing time as the time of winding the outer composite structure over the liner and the first dome reinforcement shell is reduced.

Preferably, the base portion is of a second outer diameter D2, the second outer diameter D2 being smaller than the first outer diameter D1. Thus, thanks to the difference in diameter between the first outer diameter D1 and the second outer diameter D2, an insertion area is created in the first intermediate portion such that the first dome reinforcement shell either flushes with the liner or does not protrude excessively, which avoids application of an excessive mechanical stress inside the outer composite structure at the point where the first dome reinforcement shell would protrude. In a preferred embodiment, the first outer diameter D1 and the second outer diameter D2 are such that the first dome reinforcement shell flushes with the liner. As such, the outer surface of the pressure vessel is particularly smooth. This improves the application of the outer composite structure and reduces the mechanical stress level within the pressure vessel.

In a preferred embodiment, the first dome reinforcement shell flushes with the liner, more preferably with the generally cylindrical central portion of the liner. It avoids application of an excessive mechanical stress inside the outer composite structure at the point where the first dome reinforcement shell flushes with the liner. As such, the outer surface of the pressure vessel is particularly smooth. This improves the application of the outer composite structure and reduces the mechanical stress level within the pressure vessel.

By the expression "the first dome reinforcement shell flushes with the liner", it is meant that the outer surface of the liner is geometrically blended with the outer surface of the first dome reinforcement shell.

Preferably, the outer surface of the first dome reinforcement shell flushes with the outer surface of the generally cylindrical central portion of the liner. Thus, the first dome reinforcement shell does not protrude from the first outer diameter D1 of the generally cylindrical central portion of the liner, as the outer surface of the first dome reinforcement shell is geometrically blended with the outer surface of the generally cylindrical central portion of the liner. As such, the outer surface of the pressure vessel is particularly smooth. This improves the application of the outer composite structure and reduces the mechanical stress level within the pressure vessel.

In a preferred embodiment, the liner is a plastic liner made of thermoplastic material. This allows manufacturing type IV pressure vessel.

In a preferred embodiment, the first dome-shaped longitudinal end portion of the liner has a dome contour portion which is less concave toward the internal fluid storage chamber than a dome-shaped longitudinal end portion having a geodesic dome contour portion.

A geodesic dome it is meant to design a dome structure based on a network of great circles at the surface of a hemisphere. The geodesic intersects to form triangular elements that have local triangular rigidity and also distribute the stress across the structure. A geodesic dome contour can be generated by the technique described in pages 244-245 of the "Handbook of Composite Reinforcements" by Stuart M. Lee (ISBN: 0-471-18861-1). The geodesic dome contour provides isotensoid loading of a filament.

The term "isotensoid" refers to the property of the fully wound pressure vessel in which each filament of the outer composite structure which is wrapped around the liner and the first dome reinforcement shell experiences a constant pressure at all points in its path. In this configuration, virtually the entire stress imposed on the vessel by a compressed internal fluid is assumed by the filaments of the outer composite structure with very little of the stress being assumed by the liner.

Preferably, a greatest distance between the dome contour portion of the first dome-shaped longitudinal end portion and the dome contour portion of a dome-shaped longitudinal end portion having a geodesic dome contour portion is comprised between 0.1% and 5% of the first outer diameter, preferably between 0.5% and 2.5% of the first outer diameter. These values are suitable for the first dome-shaped longitudinal end portion, easy to implement in the manufacturing of the liner and allow a better reduction of the stress in the outer composite structure enclosing or encasing the liner and the first dome reinforcement shell. This reduction of the stress permits a reduction of the composite structure used (i.e. reduction of material).

As the first dome reinforcement shell has a shape complementary to the shape of the first dome-shaped longitudinal end portion of the liner, the first dome reinforcement shell has also a dome contour portion which is less concave toward the internal fluid storage chamber than a dome reinforcement shell having a geodesic dome contour portion.

In a preferred embodiment, the first intermediate portion of the liner has an outer peripheral surface selected from the group consisting of cylindrical, frustoconical, curved and combinations thereof. As such, the outer surface of the liner comprising the first dome reinforcement shell is particularly smooth. This improves the application of the outer composite structure and reduces the stress levels within the pressure vessel.

Preferably, the outer peripheral surface of the first intermediate portion is a combination of a first frustoconical surface and a first cylindrical surface. Thus, the liner can be seen as a stepped liner comprising a first tapered outer shoulder between the generally cylindrical central portion and the first dome-shaped longitudinal end portion.

In a preferred embodiment, the first dome reinforcement shell is fabricated using at least one of the techniques selected from the group consisting of winding, wrapping, braiding and tape placement techniques. Advantageously, the tape placement technique is a laser assisted tape placement (as known as LATP) technique.

In one particularly preferred embodiment, the first dome reinforcement shell consists of a winding of layers of fiber-reinforced composite material fabricated using a winding technique.

In a preferred embodiment, the matrix of the fiber-reinforced composite material is selected from the group consisting of thermoset resin and thermoplastic polymer. Preferably, the matrix of the fiber-reinforced composite material is a thermoset resin.

A thermoset resin is formed by mixing two or more reactive components forming a reactive thermoset precursor, which reacts upon exposure to curing conditions (e.g. heat, UV or other radiations, or simply by contacting them with one another, etc.) to form the thermoset resin. The thermoset resin must be fully cured to yield high performance composites. Once cured, the thermoset resin is solid and cannot be further processed or reshaped as the resin is unable to flow anymore. Examples of thermoset resins include unsaturated polyester, epoxy, vinyl ester, polyurea, isocyanurate, and polyurethane resins. It is possible to produce thermoset prepregs made of fibers impregnated with a reactive resin which has been only partially cured to make it tacky, but still soft. The prepregs can be stored and later further processed under pressure by heating or exposing the resin to UV to complete curing and consolidating the prepregs.

A thermoplastic polymer can pass from solid state (or non-flowable state) to a liquid state (or flowable state) and reverse by increasing and lowering the temperature, respectively. In case of semi-crystalline polymers, lowering the temperature of the thermoplastic drives the formation of crystals and the solidification of the thermoplastic. Inversely, heating a semi-crystalline polymer above the melting temperature thereof melts the crystals and the thermoplastic can flow. Examples of semi-crystalline thermoplastics include polyether ketones such as PEEK, PEKK, PEKKEK, polyamides, such as PA6, PA66, PA10, PA11, PA12, polyolefins such as PE, PP, and the like. Amorphous thermoplastics do not form crystals and do not have a melting temperature. The amorphous thermoplastics solidify or become flowable depending on whether the material temperature is below or above the glass transition temperature thereof. Examples of amorphous thermoplastics include PEI, PSU, PES, PC, PS, TPU, and the like. Both semi-crystalline and amorphous thermoplastics can therefore be reshaped by heating them above their melting or glass transition temperatures and frozen into their new shape by lowering the temperature accordingly. Even though not strictly correct from a physical point of view, for sake of simplicity, both semi-crystalline and amorphous thermoplastics in a liquid state are herein referred to as a "thermoplastic melt".

In a preferred embodiment, the fibers of the fiber-reinforced composite material are fibers selected from the group consisting of carbon fibers, aramid fibers and glass fibers. This allows for a good compromise between weight reduction and mechanical strength of the fiber-reinforced composite material. More preferably, the fibers of the fiber-reinforced composite material are carbon fibers.

In a preferred embodiment, the fibers of the fiber-reinforced composite material used for fabricating the first dome reinforcement shell are continuous fibers with high modulus, e.g. 250 GPa. This further improves the mechanical strength of the fiber-reinforced composite material.

In a preferred embodiment, the liner further comprising:
a third outer diameter at a second longitudinal end, axially opposite to the first longitudinal end, of the generally cylindrical central portion,
a second dome-shaped longitudinal end portion having a base portion, preferably of a fourth outer diameter, the fourth outer diameter being smaller than the third outer diameter, and a second intermediate portion located between the generally cylindrical central portion and the base portion for connecting the second longitudinal end of the generally cylindrical central portion to the base portion of the second dome-shaped longitudinal end portion,
and the pressure vessel further comprises a second dome reinforcement shell having a shape complementary to the shape of the second dome-shaped longitudinal end portion and its second intermediate portion, said second dome reinforcement shell being fitted on the liner only on the second dome-shaped longitudinal end portion and its second intermediate portion.

With this arrangement, each longitudinal end of the generally cylindrical central portion of the liner has a dome-shaped longitudinal end portion which presents the advantageous mechanical properties of the invention.

In a preferred embodiment, the second dome reinforcement shell flushes with the liner, more preferably with the generally cylindrical central portion of the liner.

Preferably, the outer surface of the second dome reinforcement shell flushes with the outer surface of the generally cylindrical central portion of the liner.

In a preferred embodiment, the second dome-shaped longitudinal end portion of the liner has a dome contour portion which is less concave toward the internal fluid storage chamber than a dome-shaped longitudinal end portion having a geodesic dome contour portion.

Preferably, a greatest distance between the dome contour portion of the second dome-shaped longitudinal end portion and the dome contour portion of a dome-shaped longitudinal end portion having a geodesic dome contour portion is comprised between 0.1% and 5% of the third outer diameter, preferably between 0.5% and 2.5% of the third outer diameter. These values are suitable for the second dome-shaped longitudinal end portion, easy to implement in the manufacturing of the liner and allows a better reduction of the stress in the outer composite structure enclosing or encasing the liner and the second dome reinforcement shell. This reduction of the stress permits a reduction of the composite structure used.

As the second dome reinforcement shell has a shape complementary to the shape of the second dome-shaped longitudinal end portion of the liner, the second dome reinforcement shell has also a dome contour portion which is less concave toward the internal fluid storage chamber than a dome reinforcement shell having a geodesic dome contour portion.

Advantageously, the third outer diameter is approximately equal to the first outer diameter D1.

Preferably, the fourth outer diameter is approximately equal to the second outer diameter D2.

Advantageously, the second intermediate portion of the liner has an outer peripheral surface selected from the group consisting of cylindrical, frustoconical, curved and combinations thereof. As such, the outer surface of the liner comprising the second reinforcement shell is particularly smooth. This improves the application of the outer composite structure and reduces the stress levels within the pressure vessel.

Preferably, the outer peripheral surface of the second intermediate portion is a combination of a second frustoconical surface and a second cylindrical surface. Thus, the liner can be seen as a stepped liner comprising a second tapered outer shoulder between the generally cylindrical central portion and the second dome-shaped longitudinal end portion.

In a preferred embodiment, the second dome reinforcement shell is fabricated using at least one of the techniques selected from the group consisting of winding, wrapping, braiding and tape placement techniques. Advantageously, the tape placement technique is a laser assisted tape placement (LATP) technique.

In one particularly preferred embodiment, the second dome reinforcement shell consists of a winding of layers of fiber-reinforced composite material fabricated using a winding technique.

In a preferred embodiment, glass fibers layers may be provided over the outer composite structure, in order to protect the reinforcing fibers of the helical layers and hoop layers of reinforcing fibers.

Preferably, the reinforcing fibers are carbon fibers.

The invention further concerns a vehicle comprising a pressure vessel according to the invention.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 1:
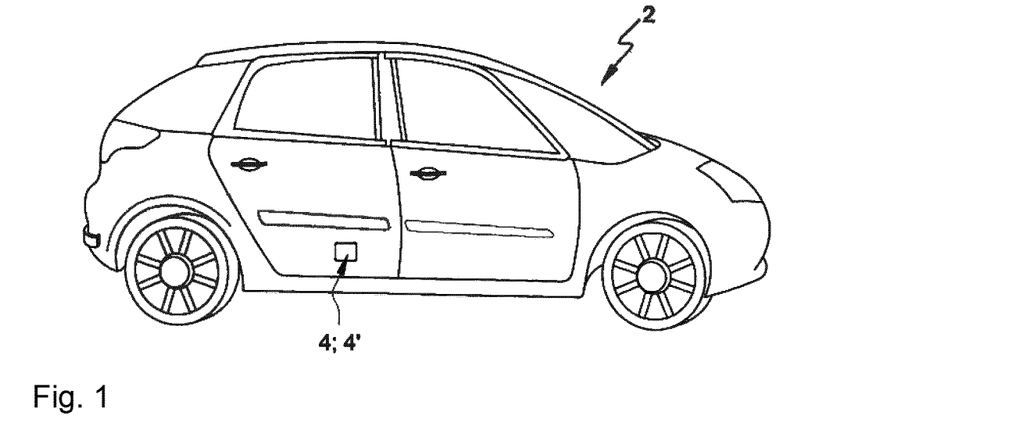
FIG. 1 is a general view of a vehicle according to the invention.

FIG. 1 represents a vehicle 2 comprising a pressure vessel 4; 4' configured for containing a gas under high pressure. For example, the pressure vessel 4; 4' may contain dihydrogen for powering a fuel cell of the vehicle. By the expression "pressure vessel", it is meant a vessel intended for storing gas under pressure able to withstand an internal pressure going up to 700 bar. For example, the pressure vessel may be compliant with Addendum 133—Regulation No. 134 of the "*Agreement Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions*" issued by the United Nations.

Figure 2:
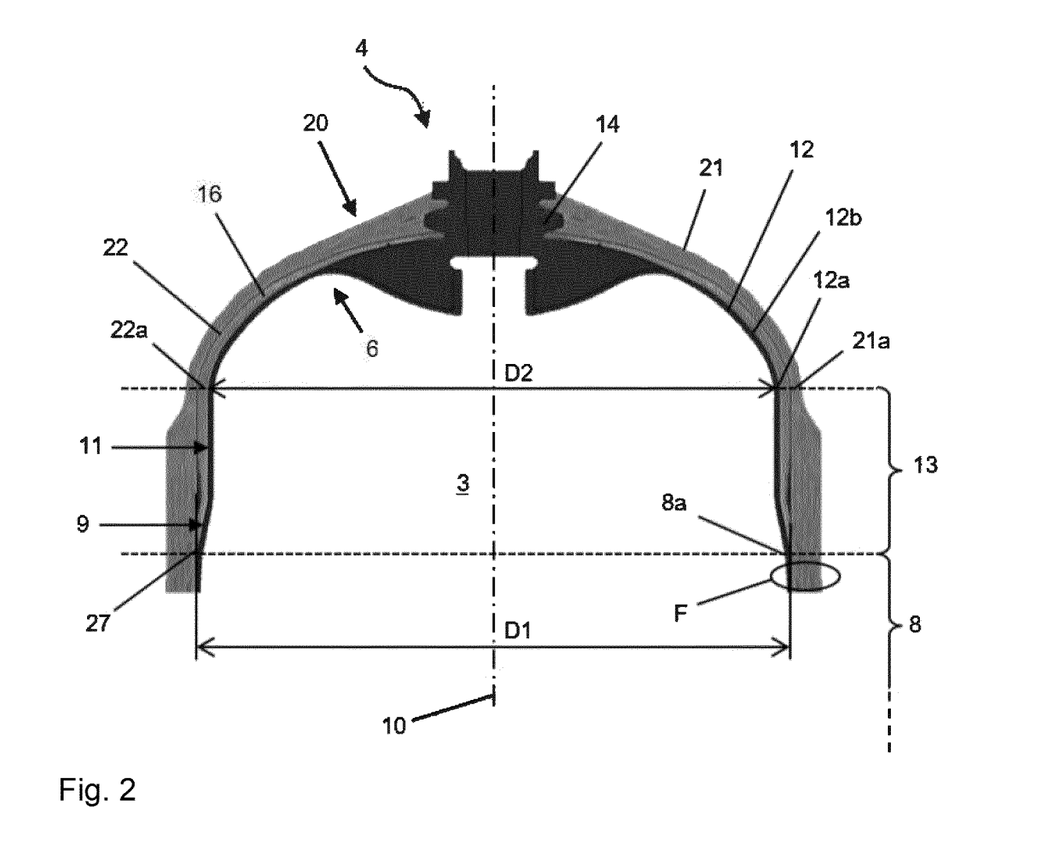
FIG. 2 is a cross section of a pressure vessel according to a first embodiment of the invention.

FIG. 2 represents a half of a pressure vessel 4 according to a first embodiment of the invention. The pressure vessel 4 comprises an internal fluid storage chamber 3 defined by a liner 6. The liner 6 has a generally cylindrical central portion 8 extending along a longitudinal axis 10 and two similar dome-shaped longitudinal end portions: a first dome-shaped longitudinal end portion 12 and a second dome-shaped longitudinal end portion, only the first dome-shaped longitudinal end portion 12 being shown on FIG. 2. The liner 6 has a plane of symmetry which is perpendicular to the longitudinal axis 10 and pass through a center of volume of the liner 6. In other embodiments, the liner 6 may have only one dome-shaped longitudinal end portion 12.

In the following, only the first element of each pair of elements will be described, knowing the second one can be deduced by symmetry with respect to the plane of symmetry.

The generally cylindrical central portion 8 has a first outer diameter D1 at a first longitudinal end 8a of the liner 6. The first dome-shaped longitudinal end portion 12 has a central axis coaxial with the longitudinal axis 10 and a base portion 12a of a second outer diameter D2, D2 being smaller than D1. The liner 6, more precisely the first dome-shaped longitudinal end portion 12, further comprises a first intermediate portion 13 located between the generally cylindrical central portion 8 and the base portion 12a. The first intermediate portion 13 connects the first longitudinal end 8a of the generally cylindrical central portion 8 to the base portion 12a of the first dome-shaped longitudinal end portion 12.

The pressure vessel 4 comprises an outer composite structure 20 enclosing or encasing both the liner 6 and a first dome reinforcement shell 16. The outer composite structure 20 comprises a dome-shaped portion 21 having a base portion 21a. The first dome reinforcement shell 16 has a shape complementary to the shape of the first dome-shaped longitudinal end portion 12 and its first intermediate portion 13. The first dome reinforcement shell 16 is fitted on the liner 6 only on the first dome-shaped longitudinal end portion 12 and its first intermediate portion 13. Indeed, the difference in diameter between the first outer diameter D1 and the second outer diameter D2 is such that an insertion area in the form of a first tapered outer shoulder is created in the first intermediate portion 13 such that the first dome reinforcement shell 16 flushes with the liner 6. In the latter position, the first tapered outer shoulder accommodates a tip 27 of the first dome reinforcement shell 16. Thus, the first dome reinforcement shell 16 flushes with the liner 6, more preferably with the generally cylindrical central portion 8 of the liner 6. More precisely, the outer surface of the first dome reinforcement shell 16 flushes with the outer surface of the generally cylindrical central portion 8 of the liner 6.

Advantageously, the first dome-shaped longitudinal end portion 12 of the liner 6 has a dome contour portion 12b which is less concave toward the internal fluid storage chamber 3 than a dome-shaped longitudinal end portion having a geodesic dome contour portion.

Preferably, a greatest distance between the dome contour portion 12b of the first dome-shaped longitudinal end portion 12 and the dome contour portion of a dome-shaped longitudinal end portion having a geodesic dome contour portion is comprised between 0.1% and 5% of the first outer diameter D1, preferably between 0.5% and 2.5% of the first outer diameter D1.

As the first dome reinforcement shell 16 has a shape complementary to the shape of the first dome-shaped longitudinal end portion 12 of the liner 6, the first dome reinforcement shell 16 has also a dome contour portion which is less concave toward the internal fluid storage chamber 3 than a dome reinforcement shell having a geodesic dome contour portion.

In the present embodiment, the first intermediate portion 13 of the liner 6 has an outer peripheral surface consisting in a combination of a first frustoconical surface 9 and a first cylindrical surface 11.

The pressure vessel 4 comprises a boss 14 for charging and discharging a fluid into and out of the liner 6. The boss 14 is fitted in an aperture located at the first dome-shaped longitudinal end portion 12 of the liner 6, axially opposite to the base portion 12a.

The first dome reinforcement shell 16 consists of a winding of layers of fiber-reinforced composite material. The fiber-reinforced composite material may either be preimpregnated and cured after being laid or not be preimpregnated and impregnated by, for example, a resin infusion process or a resin transfer molding process, commonly called a RTM process. During such processes, the curing of the composite material takes place while the composite material remains inside the resin infusion tool or the resin transfer mold. It should be noted that the RTM process permits to obtain an extra smooth outer surface of the first dome reinforcement shell 16 with decreased internal stresses. The first dome reinforcement shell 16 has a dome-shaped portion 22 with a base portion 22a and a central axis which is coaxial with the longitudinal axis 10 of the liner 6. The fibers of the fiber-reinforced composite material are fibers selected from the group consisting of carbon fibers, aramid fibers and glass fibers. Preferably, the fibers of the fiber-reinforced composite material are carbon fibers.

Moreover, glass fibers layers may be provided over the outer composite structure 20, in order to protect the reinforcing fibers of the helical layers 20a and hoop layers 20b of reinforcing fibers.

Figure 3:
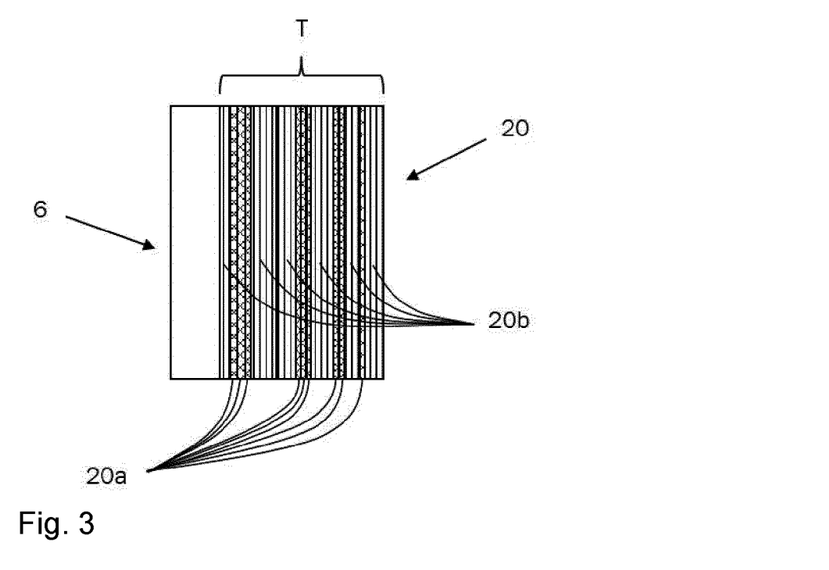
FIG. 3 is a detailed view of the portion indicated by F in FIG. 2.

FIG. 3 shows the detailed view of the portion indicated by F in FIG. 2. The outer composite structure 20 of a pressure vessel according to the present invention has a thickness T comprising both helical layers 20a and hoop layers 20b of reinforcing fibers, wherein at least 20% of the combined thickness of all helical layers 20a are located within the 25% innermost thickness T of the outer composite structure 20. In the present embodiment, the reinforcing fibers are carbon fibers. Preferably, at least 30% of the combined thickness of all helical layers 20a are located within the 20% innermost thickness T of the outer composite structure 20. In the present embodiment, the outer composite structure 20 comprises fifteen layers: nine helical layers 20a and six hoop layers 20b.

Figure 4:
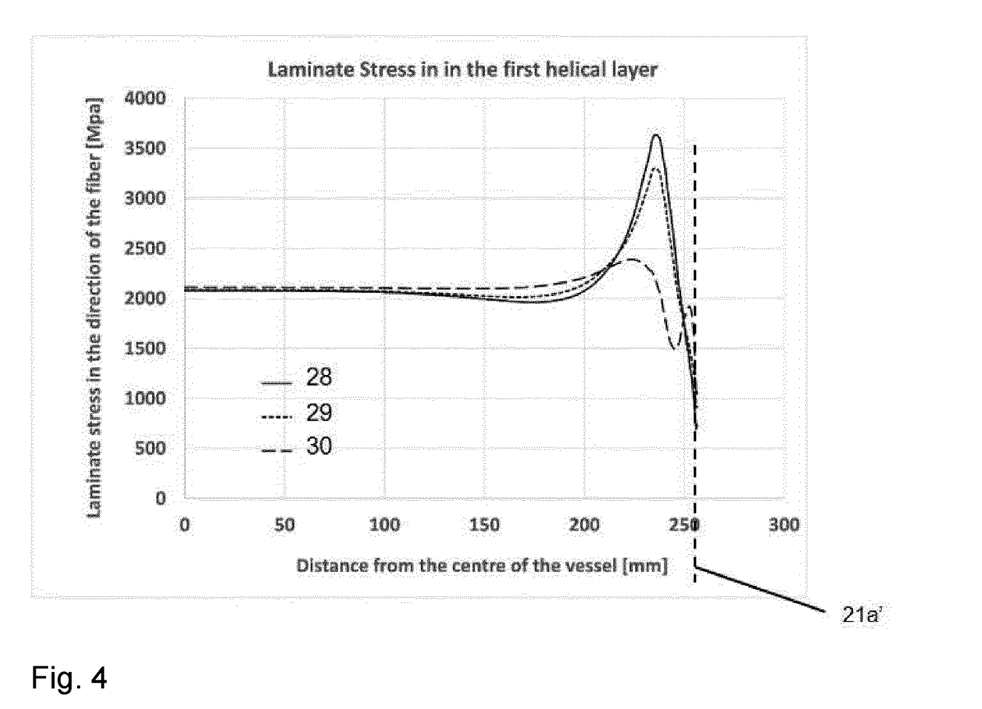
FIG. 4 are simulation graphics comparing the mechanical stress in the first helical layer of the outer composite structure for different helical layer arrangements within the innermost thickness of the outer composite structure.

FIG. 4 illustrates simulation results made with ABAQUS 2017 software combined with Wound Composite Modeler (as known as WCM) for ABAQUS 2017 comparing different stresses in the outer composite structure 20 enclosing or encasing both the liner 6 and the dome reinforcement shell 16. The stresses comparison is performed in the first helical layer of the nine helical layers 20a of the outer composite structure 20, in a section between distance zero and distance 21a' from the center of the volume of the liner 6, wherein distance zero corresponds to the axial position of the center of the volume of the liner 6 along the longitudinal axis 10 and distance 21a' corresponds to the axial position of the base portion 21a along the longitudinal axis 10 of the pressure vessel.

In this latter figure, the continuous line 28 shows that the internal stress in the first helical layer of the outer composite structure 20 can reach 3500 MPa and more in the region of the first intermediate portion 13, near the base portion 21a, when less than 20% of the combined thickness of all nine helical layers 20a are located within the 25% innermost thickness T of the outer composite structure 20. The short-dashed line 29 shows that the internal stress in the first helical layer of the outer composite structure 20 is below 3500 MPa in the region of the first intermediate portion 13, near the base portion 21a, when at least 20% of the combined thickness of all nine helical layers 20a are located within the 25% innermost thickness T of the outer composite structure 20. The long-dashed line 30 shows that the internal stress in the first helical layer of the outer composite structure 20 is below 2500 MPa in the region of the first intermediate portion 13, near the base portion 21a, when at least 30% of the combined thickness of all nine helical layers 20a are located within the 20% innermost thickness T of the outer composite structure 20. In this simulation, the internal stress in the first helical layer of the outer composite structure 20 is actually the lamina stress in the direction of the fiber of the first helical layer of the outer composite structure 20.

From the latter figure, it will also be seen that the internal stress in the first helical layer of the outer composite structure 20 can be significantly reduced by locating more helical layers 20a within the innermost thickness T of the outer composite structure 20.

Figure 5:
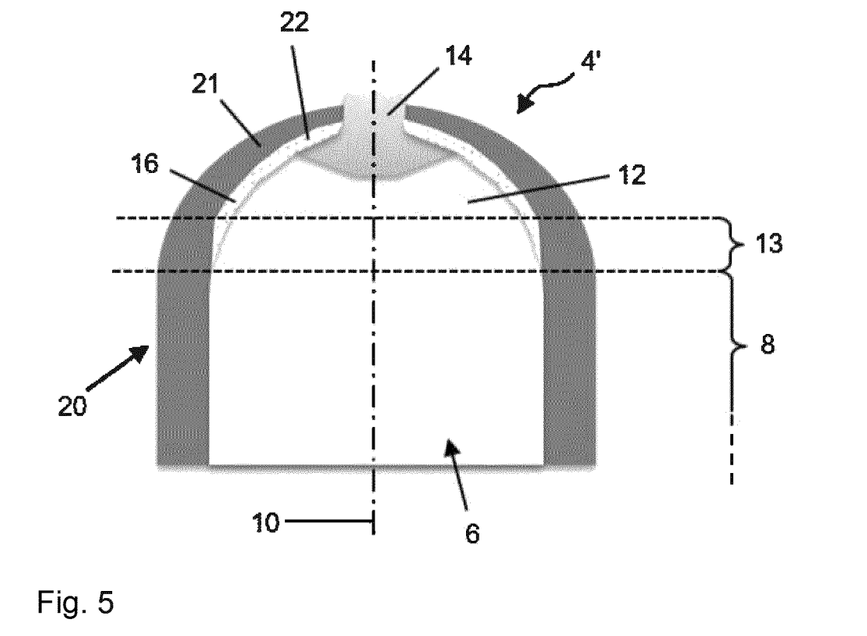
FIG. 5 is a partial cross-section view of a second embodiment of the invention.

FIG. 5 shows a variant embodiment of the invention. In this embodiment, the pressure vessel 4' differs from the pressure vessel 4 in that the first intermediate portion 13 of the liner 6 has an outer peripheral surface consisting in a curved surface.

The pressure vessel of the invention may be manufactured by means which are already well known in the art and which will not be described in further details here.

LIST OF REFERENCES

2: vehicle
3: internal fluid storage chamber
4; 4': pressure vessel
6: liner
8: generally cylindrical central portion
8a: first longitudinal end
9: first frustoconical surface
10: longitudinal axis
11: first cylindrical surface
12: first dome-shaped longitudinal end portion of the liner
12a: base portion of the first dome-shaped longitudinal end portion
12b: dome contour portion of the first dome-shaped longitudinal end portion
13: first intermediate portion
14: boss
16: first dome reinforcement shell
20: outer composite structure
20a: helical layer
20b: hoop layer
21: dome-shaped portion of the outer composite structure
21a: base portion of the dome-shaped portion of the outer composite structure
21a': second axial position
22: dome-shaped portion of the first dome reinforcement shell
22a: base portion of the dome-shaped portion of the first dome reinforcement shell
27: tip of the first dome reinforcement shell
28: continuous line 29: short-dashed line
30: long-dashed line

The invention claimed is:

1. A pressure vessel comprising:
an internal fluid storage chamber; and
an outer composite structure enclosing or encasing the internal fluid storage chamber,
wherein the outer composite structure has a thickness comprising both helical layers and hoop layers of reinforcing fibers, wherein at least 20% of a combined thickness of all of the helical layers are located within a 25% innermost thickness of the outer composite structure, and
wherein the internal fluid storage chamber is defined by a liner comprising:
a generally cylindrical central portion having a first outer diameter at a first longitudinal end, and
a first dome-shaped longitudinal end portion having a base portion and a first intermediate portion located between the generally cylindrical central portion and the base portion for connecting the first longitudinal end of the generally cylindrical central portion to the base portion of the first dome-shaped longitudinal end portion,
wherein the pressure vessel further comprises a first dome reinforcement shell having a shape complementary to a shape of the first dome-shaped longitudinal end portion and the first intermediate portion,
wherein said first dome reinforcement shell being fitted on the liner only on the first dome-shaped longitudinal end portion and the first intermediate portion.

2. The pressure vessel according to claim 1, wherein the first dome reinforcement shell flushes with the liner.

3. The pressure vessel according to claim 1, wherein at least 30% of the combined thickness of all of the helical layers are located within the 20% innermost thickness of the outer composite structure.

4. The pressure vessel according to claim 1, wherein the base portion is of a second outer diameter,
the second outer diameter being smaller than the first outer diameter.

5. The pressure vessel according to claim 1, wherein the first dome-shaped longitudinal end portion of the liner has a dome contour portion which is less concave toward the internal fluid storage chamber than a dome-shaped longitudinal end portion having a geodesic dome contour portion.

6. The pressure vessel according to claim 5, wherein a greatest distance between the dome contour portion of the first dome-shaped longitudinal end portion and the dome contour portion of a dome-shaped longitudinal end portion having a geodesic dome contour portion is comprised between 0.1% and 5% of the first outer diameter.

7. The pressure vessel according to claim 1, wherein the first dome reinforcement shell has a dome contour portion which is less concave toward the internal fluid storage chamber than a dome reinforcement shell having a geodesic dome contour portion.

8. The pressure vessel according to claim 1, wherein the first intermediate portion of the liner has an outer peripheral surface selected from the group consisting of cylindrical, frustoconical, curved and combinations thereof.

9. The pressure vessel according to claim 8, wherein the outer peripheral surface of the first intermediate portion is a combination of a first frustoconical surface and a first cylindrical surface.

10. The pressure vessel according to claim 1, wherein the first dome reinforcement shell consists of a winding of layers of a fiber-reinforced composite material.

11. The pressure vessel according to claim 1, wherein the liner further comprises:
a third outer diameter at a second longitudinal end, axially opposite to the first longitudinal end, of the generally cylindrical central portion,
a second dome-shaped longitudinal end portion having a base portion and a second intermediate portion located between the generally cylindrical central portion and the base portion for connecting the second longitudinal end of the generally cylindrical central portion to the base portion of the second dome-shaped longitudinal end portion,
the pressure vessel further comprising a second dome reinforcement shell having a shape complementary to a shape of the second dome-shaped longitudinal end portion and the second intermediate portion, said second dome reinforcement shell being fitted on the liner only on the second dome-shaped longitudinal end portion and the second intermediate portion.

12. A vehicle comprising the pressure vessel of claim 1.

* * * * *